June 18, 1968     S. L. GROSSHANDLER     3,388,705
UNIVERSAL ENDOTRACHEAL TUBE COUPLING OR ADAPTOR
Filed April 8, 1965
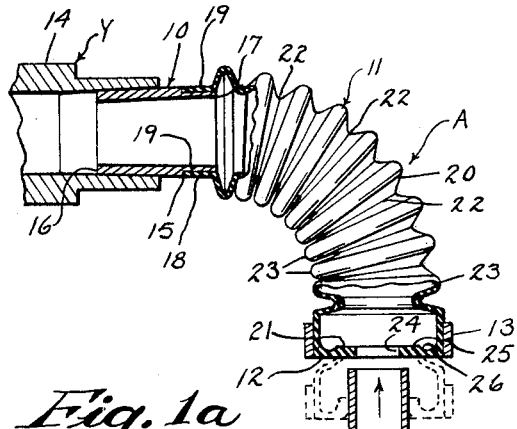
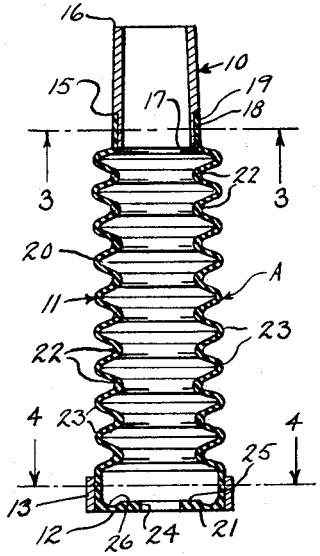
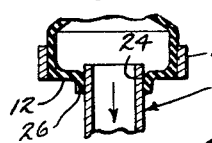
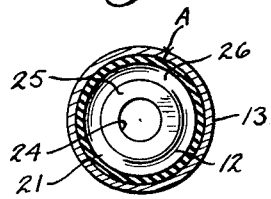
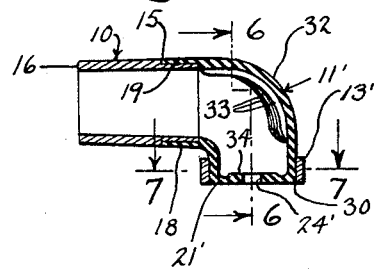
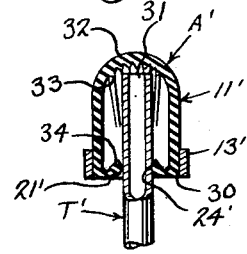
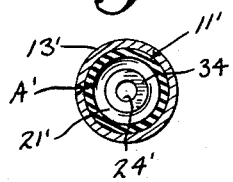
INVENTOR
STANLEY L. GROSSHANDLER
BY
George H. Wright 3,388,705
UNIVERSAL ENDOTRACHEAL TUBE
COUPLING OR ADAPTOR
Stanley L. Grosshandler, Hales Corners, Wis., assignor, by mesne assignments, to The Foregger Company, Inc., Roslyn Heights, N.Y., a corporation of New York
Filed Apr. 8, 1965, Ser. No. 446,650
7 Claims. (Cl. 128—351)

ABSTRACT OF THE DISCLOSURE

An adaptor for attaching endotracheal tubes to anesthesia machines. The adaptor has a molded tubular body having a tapered metal sleeve on one end adapted to be sealingly engaged within a female connector on the chimney of an anesthesia machine. The other end of the body is provided with a flexible diaphragm integral therewith, the diaphragm being provided with an axial opening of a smaller diameter than the diameter of the smallest endotracheal tube to be inserted thereinto, and a rigid reinforcing ring bonded to the outer periphery of the body adjacent said other end, the diaphragm being provided with arcuate peripheral walls of a thicker dimension about the opening therethrough. In a first illustrative embodiment, the body is of a flexible bellows-like shape having radially inner and outer convolutions. In a second illustrative embodiment, the body is molded with a right angle bend. The convoluted wall of the body of the first embodiment prevents the closing off of the endotracheal tube, even if the body should be bent to engage the inner end of the endotracheal tube. In the second embodiment ribs are molded on the inner surface of the body at the curve therein for the same purpose.

---

Heretofore, in the use of anesthesia machines, the machines per se are provided with outlets or a chimney Y and these are of a standard I.D. usually 15 mm. Detachably secured to the chimney Y is an adaptor to provide a connection with the endotracheal tube. It is necessary because of many and varied uses of the machine, and also due to the differences in the individual patients, that endotracheal tubes of different diameters be used and usually this varies from 3 mm. to 12 mm. I.D., giving a number of tubes of some 33 different sizes and types.

In this specialized field of anesthesia, the coupling between the machine and the endotracheal tube must be positive and air-tight, and it is necessary that the tube be capable of being quickly attached and detached. This is particularly true where emergencies arise. Care must be taken obviously, and the diameter of the proper endotracheal tube ascertained prior to its use so that the proper adaptor can be selected. Further, under varying circumstances, depending on the location and type of machine, as well as the position of the patient, the endotracheal tube must be attached to the adaptor in a manner so that it extends at different angles to the machine, and therefore, in the past, not only must 33 different types of adaptors be provided, but sets in groups of 11 are provided so that the adaptor pipe extends at different angles from the chimney Y. There has long been a need, therefore, for a universal adaptor that can be readily attached to the chimney Y of the machine and have a means at one end to accommodate different sized endotracheal tubes to hold these different sized tubes firmly and in an air-tight condition and at any desired angle. In the past the lumen of the tube has been compromised since the tube in all known prior adaptors fits over the adaptor end. It is important that the lumen of the tube not be compromised, and of course, the endotracheal tube must be open and free at all times.

It is, therefore, a primary object of my present invention to provide an adaptor for an anesthesia machine which can be readily and easily secured to the chimney Y of the machine and which will accommodate different sizes of endotracheal tubes in an air-tight leak-proof manner.

Another important object of my present invention is to provide an adaptor wherein the proximal end will fit any standard chimney Y and wherein the proximal end is tapered for a positive fit, the opposite end of the adaptor being provided with a resilient and flexible diaphragm having a hole through its axial center and said hole or aperture being of a smaller diameter than the smallest diameter of tube being used.

A further object of my present invention is to provide an adaptor wherein the proximal end is of a light-weight tapered aluminum, plastic or other hard material, to which is affixed a flexible and resilient intermediate tube terminating in an integral diaphragm about which is bonded or affixed an aluminum stiffening ring.

Still another object of my present invention is to provide a universal adaptor wherein the aperture in the diaphragm is strengthened so that as the hole or aperture stretches, upon the insertion of the endotracheal tube, it will tightly grip the outer periphery of the tube to seal the same.

A salient feature of my invention resides in providing means wherein the endotracheal tube will always remain open and free and wherein the walls of the adaptor cannot obstruct or seal the tube and wherein the lumen will not be compromised.

A more specific object of my present invention is to provide a modified universal adaptor made particularly to accommodate the smaller tubes used for children.

A salient feature of my present invention resides in providing a universal adaptor wherein the proximal end is of a tapered aluminum sleeve firmly bonded to a urethane rubber or silicone or other resilient material tube of pleated or accordion shape, its other end being reinforced by an aluminum ring and including an integral diaphragm with a hole for firmly receiving any size endotracheal tube.

Still another object of my present invention is to provide the inner convolute of the accordion pleat with walls which are of heavier gage than the outer convolutes thus preventing, when the tube is flexed or bent, the collapse of the tube when moved through different angles and the closing of the inner end of the endotracheal tube.

An important object of my present invention also resides in providing the smaller model with molded spaced projections or ribs in the resilient intermediate angularly shaped tube adjacent the bend of the tube and against which the end of the endotracheal tube may on occasion abut, thus assuring that the end of the tube will remain open at all times.

With the above and other objects in view, which will more readily appear as the nature of the invention is better understood, the same consists in the novel construction, combination and arrangement of parts hereinafter more fully described, illustrated and claimed.

A preferred and practical embodiment of my invention is shown in the accompanying drawing, in which:

FIG. 1 is a side elevational view in perspective of one form of my invention with certain parts being broken away and in section to illustrate details in construction, the adaptor being shown flexed with the tube adjacent the aparture prior to insertion, also illustrating in dotted lines how the diaphragm fits about the outer periphery of the tube;

FIG. 1a is a fragmentary section through the diaphragm end of the adaptor, illustrating how the thickened ring or lip flexes or reverses when the tube is being removed;

FIG. 2 is a longitudinal section taken through the entire adaptor shown in FIG. 1;

FIG. 3 is a transverse section taken on the line 3—3 of FIG. 2 and looking in the direction of the arrows;

FIG. 4 is a transverse section taken on the line 4—4 of FIG. 2 and looking in the direction of the arrows;

FIGURE 5 is a longitudinal section through the modified or smaller adaptor;

FIGURE 6 is a vertical transverse section taken on the line 6—6 of FIG. 5 looking in the direction of the arrows, and illustrating how an endotracheal tube when inserted in the adaptor cannot be closed off but will abut the molded spaced ribs, and FIG. 7 is a transverse horizontal view through the diaphragm end of the adaptor, the section being taken on the line 7—7 of FIG. 5, looking in the direction of the arrows.

Referring now to the drawings in detail, wherein similar reference characters designate corresponding parts throughout the several views, the letter A generally indicates one type of my improved universal adaptor and the same includes broadly a cylindrical fitting 10, a flexible and resilient tube 11, diaphragm 12 and a reinforcing ring 13.

As previously brought out, this adaptor is designed to provide a low pressure, gas tight coupling between a hose, tubing or rod of a larger cross section. It is particularly useful where the coupling is made and broken frequently, and where the circumference of the smaller member may be frequently changed. A primary application of this invention is in the coupling of an endotracheal tube T to the chimney Y which in turn, connects to an anesthesia machine (not shown). With the adaptor or coupling A of the present invention, the need for multiple endotracheal connectors or adaptors is eliminated. My novel universal adaptor A will provide connection between the chimney Y and a whole range of sizes of endotracheal tubes T.

The cylindrical sleeve 10 may be made of any desired rigid material but is preferably formed from an anodized aluminum which is particularly useful for its light weight and non-corrodible qualities. In any event, the sleeve 10 is tapered and its outer periphery reduced from the point 15 to its inner end 16 so that it can be readily inserted in the aperture in the chimney 14 and held in place. The outer end 17 of sleeve 10 is formed with a reduced portion 18 to which the end 19 of the bellows-like flexible tube 11 is bonded. The tube 11 may also be formed from any flexible and resilient material but preferably is made from a polyurethane which is superior to other materials due to its high coefficient of friction, its non-toxic qualities, the fact that it is inert and will not tear under large expansion, and thus gives an overall longer lasting quality. It should be noted that the flexible resilient tube 11 is molded in a single unitary piece providing an open end 19 which is bonded to the sleeve 10 as shown, a bellows-like intermediate body portion 20 and a diaphragm 21. On the other hand, it is important to note, and attention is directed more particularly, to FIGURE 2 of the drawings, that the annular wall 22 of the inner convolutes are of a heavier and thicker dimension than the walls 23 of the outer convolutes. This is important since in the use of the adaptor A, the body portion 20 of the tube 11 may be constantly moved and flexed and it should not kink in such a manner as to close or greatly obstruct the flow of gas. Thus the thickened walls of the inner convolutes 22 prevent the collapse and kinking of the body 20 as it is moved and bent at various angles.

The particular structure of the diaphragm 21 also forms a salient feature of the invention and the axial center of the diaphragm is provided with an aperture or hole 24 and this hole is of a size and configuration to be smaller than the outer circumference of the smallest endotracheal tube used. Attention is also directed to the fact that the annular wall 25 surrounding the aperture 24 is strengthened and thickened and has a greater thickness than the inner portion of the diaphragm as designated by the reference numeral 26. Thus, due also to the high coefficient of friction of the material used when an endotracheal tube T is inserted into the aperture, it will be firmly held therein and noting the dotted lines of FIGURE 1, as well as FIGURE 6 illustrating a modified form, it can be seen that the diaphragm itself flexes inwardly as the tube is inserted and the thickened ring 26 surrounding the aperture 24 stretches and the tight fit prevents the accidental withdrawal of the tube T. During use, however, the tube can be quickly pulled out of the diaphragm when a quick detachment is necessary (FIG. 1a), and the lip or ring 26 will reverse itself but still engage and seal against the tube walls at all times until the tube actually leaves the aperture. The accordion or bellow shape of the tube 11 is also extremely important not only that it materially aids in the flexibility and bending of the body but if a tube is accidentally inserted too far into the body 20, it will contact portions of the inner convolutes 22 and the spacing between the convoluted parts will prevent the closing off of the endotracheal tube thus always insuring a free flow of gas. In order to further strengthen and to provide means whereby the diaphragm can be held when inserting the tube or conversely when positioning the diaphragm onto the tube, I also bond the aluminum ring 13 adjacent the outer periphery of the end walls 27 of the flexible member 11. This aids materially in stiffening the outer edge of the diaphragm and facilitates the handling and use of the adaptor. Incidentally, it has been found that the aluminum sleeve 10 and ring 13 can be readily and permanently bonded to the resilient tube 11 to give an integral product.

From the foregoing, therefore, it should be readily apparent that one universal adaptor A will provide connection with the chimney Y 14 and a whole range of sizes of endotracheal tubes. In general practice, however, these tubes include some 16 sizes and further, since the circumference of the chimney Y is standard in all machines, prior adaptors have been provided having an inner end to fit over the chimney Y (compromising the lumen) and having a fixed smaller end usually of a rigid material to receive the particular size endotracheal tube needed for a particular operation. Obviously, this necessitated the selection of the proper adaptor and tube so that the proper size tube may be utilized. Further, depending on the position of the patient or particular type of machine, the endotracheal tube must be connected to the chimney Y at a certain angle rather than having a straight connector and hence, in the past, sets of 33 sizes and types of adaptors have been provided wherein the body extends from the proximal end at a 90 degree angle and other sets which extend at other angles.

My adaptor A with its flexible bellows-type body 20 thus can accommodate all angles and the different sizes of endotracheal tubes and the same can be quickly and easily attached and detached and further, due to the thickening of the walls of the inner convolutes 22, kinking is eliminated regardless of the angle assumed. This is extremely important, for example, in nasal intubations, prone positions, and other unusual positions and the diaphragm holds the tube with a secure and air-tight fit and yet does not compromise the lumen of the tube. The high coefficient of friction of the material used in the diaphragm does not permit the tube T to be pulled or forced out with ease. Tubes have been clamped off and pressure of greater than 40 mm. of mercury have been applied without the tube blowing free or air escaping and this is, of course, well within the safe limits of use of all known anesthesia machines and situations. However, when comparing the force necessary to pull the tube free with human strength, it is comparatively easy to detach.

While that form of my invention shown in FIGS. 1 to 4, inclusive, will accommodate all sizes of endotracheal tubes, I utilize this form as an adult model accommodating generally endotracheal tubes within the range of 8 mm. to 10 mm. I.D. which are the usual sizes needed for adult situations, Therefore, in FIGURES 5 and 6, of the drawing I have illustrated a modified adaptor A' which is primarily designed as a children's model and accommodates endotracheal tubes T' in the range of 3 to 12 mm I.D. It should, of course, be understood that both models can be made to accommodate the entire range of tubes, and therefore, the modified model illustrated in FIGS. 5 and 6 of the drawing includes the sleeve 10 which is identical in every way to the sleeve 10 utilized in that form of my adaptor illustrated in FIGURES 1 to 4 of the drawings. However, intermediate tube 11' of the modified form is preferably molded at a right angle and fixed and is not provided with the bellows-like convolutes as shown in FIGURES 1 and 2 specifically. The body 11' however, is also molded of a urethane silicone or similar material and its end 30 is provided with the diaphragm 21'. The diaphragm is shaped identically to the diaphragm 21 except that its dimensions are slightly smaller and its axial aperture or hole 24' is of a smaller diameter to safely and readily grip about the smaller endotracheal tube T'. The only reason for providing the smaller aperture and providing the two different size apertures in diaphragm 21 and 21' is due to the fact that the diaphragm opening will not have to stretch and give as far, as it is limited to smaller range of tubes and thus will last longer. It has been found that larger tubes can be readily inserted through the smaller apertures without tearing or damaging the diaphragm in any way.

I also provide a reinforcing aluminum end ring 13' which is bonded to the outer peripheral walls of the end 30. Since body 11' is not provided with the flexible bellows it is important to provide some means so that the open end 31 of endotracheal tube T' cannot be forced against the surface or wall 32 and the flow of gas cut off. To prevent this, I mold integral with the curved annular inner wall 32 a series of spaced serrations or ribs 33 and as shown more particularly in FIGURE 6 of the drawing, when the endotracheal tube T' is inserted to a point where it strikes wall 32, it will abut against the serrations or ribs 33 and gas can still freely enter end 31. Attention is again directed to the manner in which the diaphragm 21' flexes inwardly and the manner in which it grips the circumference of the tube T' due to the thickened annular wall portion 34.

From the foregoing it can be seen that I have provided an extremely versatile and unique adaptor which can be readily and quickly secured to the chimney Y of a machine and which will accommodate various sizes of endotracheal tubes and hold the same in a firm and air-tight manner yet allowing the tube to be quickly withdrawn and detached. I have shown and described certain specific improvements of my invention. It will be understood that these improvements are merely for the purpose of illustration and description, that various other forms may be devised and that changes may be made in the proportion and minor details of construction without departing from the spirit of the invention or the scope of the appended claims.

I claim:

1. In an adaptor of the type to provide a connection between an anesthetic machine and endotracheal tubes of smaller and different dimensions than the chimney Y of the machine including a body of a molded flexible resilient plastic construction open at both ends, a rigid cylindrical sleeve bonded to said body at one end thereof, said sleeve being of a size and configuration to be joined to said chimney Y, an integral flexible diaphragm formed on the other end of said body, said diaphragm being provided with an axial opening of a smaller diameter than the diameter of the smallest endotracheal tube to be inserted thereinto, and a rigid reinforcing ring bonded to the outer periphery of the body adjacent said diaphragm end, said molded plastic body being of a flexible bellows-like shape having radially inner and outer convolutions, the walls of said inner convolutions of said bellows-like body being strengthened and thickened in relation to the walls of the outer convolutions of said body.

2. A device as set forth in claim 1, wherein said rigid cylindrical sleeve is formed of a light-weight anodized aluminum and is tapered to provide a continual decreasing circumference from the bonded end towards its open end.

3. A device as set forth in claim 1, wherein said diaphragm is provided with arcuate peripheral walls of a thicker dimension about said opening.

4. An adaptor of the type to provide a connection between endotracheal tubes of different diameters than the chimney Y of an anesthesia machine, including a flexible resilient body of corrugated tubular construction, a rigid cylindrical sleeve affixed to said body at one end thereof, said sleeve being of a size and configuration to fit within said chimney Y and of a generally tapered construction, an integral flexible diaphragm formed on the other end of said tubular body, said diaphragm being provided with an axial opening of a smaller diameter than the diameter of the smallest endotracheal tube to be inserted, and a reinforcing ring affixed to the body adjacent said diaphragm end.

5. A device as set forth in claim 4, wherein the inner periphery of the axial opening of the diaphragm is thickened to provide a reinforcing lip or ring.

6. A universal endotracheal tube adaptor of the type utilized to couple an opening of a large diameter with tubes or the like of smaller and varying diameters, including a molded urethane body open at both ends and each end of which extends at right angles one to the other, a light-weight rigid cylindrical sleeve secured to one end of said body, a flexible diaphragm integral with the other end of said body and having an axial opening of a smaller diameter than the diameter of the smallest tube used, a reinforcing ring secured to the outer periphery of the walls of the body adjacent said diaphragm, and elongated ribs formed in said molded body at a point adjacent to and above said diaphragm opening, whereby a tube inserted fully into said adaptor through said opening may strike said ribs and prevent closing and sealing of the open tube end.

7. A universal endotracheal tube adaptor of the type utilized to couple an opening of a large diameter with tubes or the like of smaller and varying diameters, including a molded plastic body open at both ends, the ends of the body extending at a marked angle with respect to each other, a light-weight rigid cylindrical sleeve secured to one end of said body, a flexible diaphragm integral with the other end of said body and having an axial opening of a smaller diameter than the diameter of the smallest tube used, a reinforcing ring secured to the outer periphery of the walls of the body adjacent said diaphragm, the inner surfaces of the molded body being corrugated at a point adjacent to and above said diaphragm opening, whereby a tube inserted into said adaptor through said opening may strike the corrugated inner wall of the body and prevent closing and sealing of the open tube end.

References Cited

UNITED STATES PATENTS

| 2,273,837 | 2/1942 | Davies | 285—8 |
| 2,584,044 | 1/1942 | Osrow et al. | 285—8 |
| 2,584,450 | 2/1952 | Holt et al. | 128—203 |
| 2,587,784 | 3/1952 | Story | 285—8 |
| 2,912,982 | 11/1959 | Barsky | 128—351 |
| 3,017,880 | 1/1962 | Brook | 128—351 |

FOREIGN PATENTS

| 1,065,150 | 10/1952 | France. |
| 649,230 | 1/1951 | Great Britain. |
| 521,613 | 3/1955 | Italy. |

DALTON L. TRULUCK, *Primary Examiner.*